United States Patent Office 3,515,747
Patented June 2, 1970

3,515,747
POLYESTERS, POLYAMIDES, AND POLYESTER-AMIDES OF MIXTURES OF NITRILOTRIACETIC AND N - (ACETAMIDE) - IMINODIACETIC ACIDS
Nelson S. Marans, Silver Spring, Md., assignor to W. R. Grace & Co., New York, N.Y., a corporation of Connecticut
No Drawing. Filed Oct. 10, 1968, Ser. No. 766,616
Int. Cl. C08g 20/30, 17/04, 20/00
U.S. Cl. 260—482            5 Claims

ABSTRACT OF THE DISCLOSURE

A process for preparing a novel copolymer comprising: heating at about 110–250° C. for about 5–600 minutes a reaction mixture consisting essentially of an inert liquid medium in which the polymer is substantially insoluble, the medium boiling at about 120–260° C. at about 760 millimeters of mercury absolute pressure, N-(acetamide)-iminodiacetic acid, nitrolotriacetic acid, and a member selected from a group consisting of diols having the formula HO—G—OH, amino alcohols having the formula HO—G—NH$_2$, and diamines having the formula H$_2$N—G—NH$_2$, wherein G is an alkylene group having about 2–12 carbon atoms, the mole ratio of N-(acetamide)-iminodiacetic acid: nitrilotriacetic acid: the group member being about 1:0.1–9.0:1.0–10 to form the copolymer and water, the water being removed substantially as it is formed; separating; and recovering the copolymer.

Background of the invention

This invention is in the field of copolymers and the preparation thereof. The invention is directed to novel copolymers prepared by reacting N-(acetamide)-iminodiacetic acid, nitrilotriacetic acid, and a member selected from a group consisting of diols having the formula HO—G—OH, amino alcohols having the formula HO—G—NH$_2$, and diamines having the formula H$_2$N—G—NH$_2$, wherein G is an alkylene (divalent alkyl) group having about 2–12 carbon atoms in an inert liquid medium in which said copolymers are substantially insoluble and to the precess for preparing such polymers.

Summary of the invention

In summary, this invention is directed to a process for preparing a novel polymer (copolymer) comprising:
(a) Heating at about 110–250° C. for about 5–600 minutes a reaction mixture consisting essentially of an inert liquid medium (inert solvent) in which the polymer is substantially insoluble, the medium boiling at about 120–260° C. at about 760 millimeters of mercury absolute pressure, N-(acetamide)-iminodiacetic acid, nitrilotriacetic acid, and a member selected from a group consisting of diols having the formula HO—G—OH, amino alcohols having the formula HO—G—NH$_2$, and diamines having the formula H$_2$N—G—NH$_2$, wherein G is an alkylene group having about 2–12 carbon atoms, the mole ratio of N-(acetamide)-iminodiacetic acid:nitrilotriacetic acid: the group member being about 1:0.1–9:1–10, to form the copolymer and water, the water being removed substantialy as it is formed;
(b) Separating the copolymer from the inert medium; and
(c) Recovering the separated copolymer.

Description of preferred embodiments

In preferred embodiments of the invention described in the above summary:

(1) G is an alkylene group having 2 carbon atoms;
(2) G is an alkylene group having 6 carbon atoms;
(3) The mole ratio of N-(acetamide)-iminodiacetic acid:nitrilotriacetic acid: the group member is about 1:0.15–7:1.1–8; and
(4) The separated copolymer is dried until substantially free of inert medium before being recovered.

In another preferred embodiment ("Embodiment A") this invention is directed to a novel copolymer prepared by a process comprising:
(a) Heating at about 110–250° C. for about 10–600 minutes a reaction mixture consisting essentially of an inert liquid medium in which the polymer is substantially insoluble, the medium boiling at about 120–260° C. at about 760 millimeters of mercury absolute pressure, N-(acetamide)-iminodiacetic acid, nitrilotriacetic acid, and a member selected from a group consisting of diols having the formula HO—G—OH, amino alcohols having the formula HO—G—NH$_2$, and diamines having the formula H$_2$N—G—NH$_2$, wherein G is an alkylene group having about 2–12 carbon atoms, the mole ratio of N-(acetamide)-iminodiacetic acid:nitrilotriacetic acid; the group member being about 1:0.1–9:1–10, to form the copolymer and water, the water being removed substantially as it is formed;
(b) Separating the copolymer from the inert medium; and
(c) Recovering the separated copolymer.

In preferred embodiments of the invention set forth in Embodiment A, supra:
(1) G is an alkylene group having carbon atoms;
(2) G is an alkylene group having 6 carbon atoms;
(3) The mole ratio of N-(acetamide)-iminodiacetic acid:nitrilotriacetic acid: the group member is about 1:0.15–7:1.1–8; and
(4) The separated copolymer is dried until substantially free of inert medium before being recovered.

Detailed description of the invention

As stated supra the polymers (copolymers) of this invention are prepared by reacting in an inert liquid medium (or inert solvent) boiling at about 120–260° C. at 760 millimeters (mm.) of mercury absolute pressure a reacting mixture consisting essentially of: (a) N-(acetamide)-iminodiacetic acid (an acid having the formula

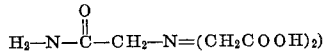

(b) nitrilotriacetic acid (an acid having the formula N≡(CH$_2$COOH)$_3$); and (c) a member selected from the group consisting of diols having the formula

amino alcohols having the formula H—O—G—NH$_2$, and diamines having the formula H$_2$N—G—NH$_2$, wherein G is an alkylene (divalent alkyl) group having 2–12 carbon atoms (preferably 2–6 carbon atoms) to form water and the desired polymer.

Water is removed from the reactive mixture continuously and substantially as it (the water) is formed. A preferred method for removing the water comprises using as inert liquid medium an inert solvent such as xylene, ethylbenzene, or the like in which water is substantially insoluble and refluxing the mixture of inert solvent and reacting mixture while condensing the vapors and collecting the resulting condensate in a water separating trap (e.g., a Dean-Stark trap or a Barrett trap, or the like), wherein the water is separated from the inert solvent, and returning the substantially water-free inert solvent to the refluxing reacting mixture.

Other methods for removing water substantially as it is formed will be readily apparent to those skilled in the art. One such method comprises continuously withdrawing a slip, or side, stream of liquid from the heated (e.g., refluxing) mixture, separating (e.g., by decantation, filtration, or centrifugation) any precipitated or insoluble polymer from the slip stream—returning such separated polymer to the heated or refluxing mixture, and contacting the slip stream with a desiccant or a water absorbing material (preferably after cooling the slip stream) such as silica gel or alumina gel to remove water from the inert solvent component of the slip stream and returning the thus contacted and now substantially water-free liquid to the reacting mixture.

When the reaction is completed or substantially completed (as determined by any convenient means, e.g., by elimination (separation) of the theoretical quantity of water or by analysis of a sample of the reacting mixture), the thus formed copolymer can be separated from the liquid medium by decantation, filtration, or centrifugation—the polymer being insoluble in the inert liquid medium, or by distilling or vaporizing the medium from said polymer and more preferably by conducting the distillation under reduced pressure. The thus separated copolymer can be recovered, or it can be dried (i.e., substantially freed of inert medium) and then recovered.

The resulting copolymers are excellent materials for chelating metal ions especially copper, iron, magnesium and calcium ions.

These polymers (copolymers) where water soluble, are especially useful as descalants for boilers, as detergents, and as additives for dishwashing compounds. Where insoluble in water, these copolymers are useful as ion exchange resins, especially as acidic resins for controlling or directing pH sensitive reactions, e.g. cyanomethylations.

The instant invention is further illustrated by the following non-limiting examples—said examples being provided to illustrate but not to limit the invention.

EXAMPLE I

A reaction mixture of 18.98 grams (g.) of N-(acetamide)-iminodiacetic acid

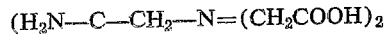

19.46 g. of nitrilotriacetic acid, 12.16 g. of ethylenediamine, and 100 milliliters (ml.) of xylene was heated in a round bottom flask at about 145° C. for 210 minutes. A reflux condenser and Dean-Stark trap were attached to the flask to condense and collect vapor formed by the heating. A water phase and a xylene phase separated in the trap in the well known manner. The resulting substantially water-free xylene phase was recycled to the round bottom flask.

As the flask and its contents were heated a layer of resinous (polymeric) material which was heavier than the liquid (xylene phase) in the flask separated. After heating for about 210 minutes, the flask was removed from the heat source and the xylene phase was decanted from the polymeric material (copolymer product), thereby to separate the copolymer from the xylene phase. The separated copolymer was heated at about 60° C. under an absolute pressure of about 5 inches of mercury for about 16 hours. The thus treated copolymer was substantially dry (i.e., substantially free of inert medium—xylene). The thus dried copolymer was recovered and weighed; it weighed 46.5 g.

The dried copolymer was a hard hygroscopic yellow resin. This resin was insoluble in ethanol. It was also insoluble in water, but is swelled when immersed in hot (ca. 80–95° C.) water.

EXAMPLE II

The general procedure of Example I was repeated. However, in this instance a reaction mixture of 18.7 g. of N-(acetamide)-iminodiacetic acid, 19.6 g. of nitrilotriacetic acid, 11.9 g. of monoethanolamine, and 100 ml. of xylene was used and the heating (reaction) time was 4 hours.

The recovered copolymer weighed 47 g.; it was completely soluble in water—1 g. of the copolymer dissolving in about 20 ml. of water at 35° C. This polymer was insoluble in acetone and completely soluble in a mixture of 1 part of water and 1 part of acetone—1 g. of the copolymer dissolving in about 50 m. of the acetone-water mixture at 55° C.

EXAMPLE III

The general procedure of Example I was repeated. However, in this instance a reaction mixture of 9.71 g. of N-(acetamide)-iminodiacetic acid, 27.7 g. of nitrilotriacetic acid, 12.64 g. of ethylenediamine, and 150 ml. of xylene were used. Heating (reaction) time was 3 hours.

Evaporation of the xylene phase which was decanted from the copolymer left a residue weighing 0.17 g.

The copolymer which was separated from the xylene phase by decanting the xylene phase from said copolymer, when dried according to the general procedure of Example I, weighed 45.9 g.

The dry copolymer was hygroscopic and insoluble in ethanol.

When treated with water at about 95° C. using about 50 ml. of water per g. of copolymer, a portion (ca. 50%) of the copolymer dissolved. The water insoluble portion of the copolymer swelled when immersed in water at about 80–95° C.

I have also found that in another embodiment of this invention the polymers of said invention can be formed by heating a mixture of the above-named reactants in the mole ratios specified supra at about 160–250° C. for the times specified supra in the absence of an inert liquid medium of the type discussed supra. Water is vaporized from the solvent (inert liquid medium)-free system substantially as if (the water) is formed.

Inert liquid media which are operative in the process of this invention include but are not limited to xylene, ethylbenzene, propylbenzene, chlorobenzene, 1,2,3,4-tetrahydronaphthalene, tetramethylbenzene, butylbenzene, octyl chloride, decyl chloride, and 4-methylbenzyl chloride. As a result of my disclosure still another inert media will be readily apparent to those skilled in the art.

Dihydric alcohols (alkylene diols) which are operable in the process of this invention include, but are not limited to; (a) ethylene glycol, the propylene glycols, the butylene glycols, the pentane diols, and the hexane diols; (b) HO—CH$_2$(CH$_2$)$_n$CH$_2$—OH, wherein $n$ is about 5–10 and the isomers thereof including

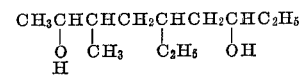

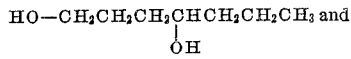

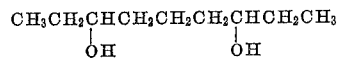

Amino alcohols which are operable in the process of this invention include, but are not limited to; (a) monoethanolamine, the monopropanolamines, the monobutanolamines, the monopentanolamines, the monooctanolamine; and (b) HO—CH$_2$(CH$_2$)$_n$CH$_2$—NH$_2$ where $n$ is about 7–10 and the isomers thereof.

Diamines which are operable in the process of this invention include, but are not limited to; (a) ethylenediamine, the propylenediamines, the butylenediamines, the diaminopentanes, the diaminohexanes, the diaminoheptanes, the diaminooctanes; and (b)

where $n$ is about 7–10 and the isomers thereof.

As used herein the term "percent (%)" means parts per hundred by weight unless otherwise defined where used, and the term "parts" means parts by weight unless otherwise defined where used.

I claim:

1. A novel copolymer prepared by a process comprising:
    (a) heating at about 110–250° C. for about 5–600 minutes a reaction mixture consisting essentially of an inert liquid medium in which the polymer is substantially insoluble, the medium boiling at about 120–260° C. at about 760 millimeters of mercury absolute pressure, N-(acetamide)-iminodiacetic acid, nitrilotriacetic acid, and a member selected from a group consisting of diols having the formula HO—G—OH, amino alcohols having the formula HO—G—$NH_2$, and diamines having the formula $H_2N$—G—$NH_2$, wherein G is an alkylene group having about 2–12 carbon atoms, the mole ratio of N-(acetamide)-iminodiacetic acid:nitrilotriacetic acid:the group member being about 1:0.1–9:1–10 to form the copolymer and water, the water being removed substantially as it is formed;
    (b) separating the copolymer from the inert medium; and
    (c) recovering the separated copolymer.

2. The copolymer of claim 1 in which G is an alkylene group having 2 carbon atoms.

3. The copolymer of claim 1 in which G is an alkylene group having 6 carbon atoms.

4. The copolymer of claim 1 in which the mole ratio of N-(acetamide)-iminodiacetic acid:nitrilotriacetic acid: the group member is about 1:0.15–7:1.1–8.

5. The copolymer of claim 1 in which the separated copolymer is dried until substantially free of inert medium before being recovered.

References Cited

UNITED STATES PATENTS 2,463,977  3/1949  Kropa _____ 260—78

FOREIGN PATENTS 842,176  2/1939  France.

WILLIAM H. SHORT, Primary Examiner

M. GOLDSTEIN, Assistant Examiner

U.S. Cl. X.R.

260—2.2, 29.2, 75, 78, 78.4, 561